United States Patent [19]
Nohda et al.

[11] Patent Number: 5,369,266
[45] Date of Patent: Nov. 29, 1994

[54] HIGH DEFINITION IMAGE PICK-UP WHICH SHIFTS THE IMAGE BY ONE-HALF PIXEL PITCH

[75] Inventors: Shigetoshi Nohda, Kanagawa; Kakuji Kunii, Tokyo, both of Japan

[73] Assignee: Sony Corporation, Tokyo, Japan

[21] Appl. No.: 74,426

[22] Filed: Jun. 10, 1993

[30] Foreign Application Priority Data

Jun. 11, 1992 [JP] Japan ................................. 4-152130

[51] Int. Cl.$^5$ ............................................. G02F 1/1335
[52] U.S. Cl. .................................... 250/208.1; 359/93
[58] Field of Search ...................... 250/208.1, 216, 225; 359/93, 245

[56] References Cited

U.S. PATENT DOCUMENTS

| | | | |
|---|---|---|---|
| 3,631,253 | 12/1971 | Aldrich et al. | 250/208.1 |
| 4,097,128 | 6/1978 | Matsumoto et al. | 359/93 |
| 4,410,238 | 10/1983 | Hanson | 359/93 |
| 4,603,356 | 7/1986 | Bates | 250/208.1 |
| 4,910,413 | 3/1990 | Tamune | 250/578.1 |
| 5,091,795 | 2/1992 | Nishioka et al. | 359/93 |
| 5,111,321 | 5/1992 | Patel | 359/93 |

FOREIGN PATENT DOCUMENTS

| | | |
|---|---|---|
| 0376395 | 7/1990 | European Pat. Off. . |
| 62-061488 | 3/1987 | Japan . |
| 62-289065 | 12/1987 | Japan . |
| 3107130 | 5/1991 | Japan . |
| WO91/12688 | 8/1991 | WIPO . |

*Primary Examiner*—David C. Nelms
*Assistant Examiner*—Stephone B. Allen
*Attorney, Agent, or Firm*—Hill, Steadman & Simpson

[57] ABSTRACT

A solid-state image pickup device for imaging an object using a CCD image sensor. The solid-state image pickup device includes a half wave plate between first and second birefringence plates 2 and 4 shifting the optical path of the image pickup light the radiation of which is interrupted by on/off control of an electrical voltage. The half wave plate transforms an ordinary light ray into an extraordinary light ray and radiates the resulting extraordinary light ray, while transforming an extraordinary light ray into an ordinary light ray and radiates the resulting ordinary light ray. The image pickup light is radiated to the CCD image sensor while the voltage to be applied across the first and second birefringence plates is on/off controlled simultaneously. When the voltage to be applied across the first and the second birefringence plates is turned off, the image pickup light ray is radiated to the CCD image sensor as an extraordinary light ray without its optical path being changed. When the voltage to be applied across the first and the second birefringence plates is turned off, the image pickup light is split into an ordinary light ray and an extraordinary light ray for light axis shifting. However, the extraordinary light ray and the ordinary light ray are summed at the second birefringence plate so as to be radiated on the CCD image sensor.

4 Claims, 4 Drawing Sheets

HIGH DEFINITION IMAGE PICK-UP WHICH SHIFTS THE IMAGE BY ONE-HALF PIXEL PITCH

BACKGROUND OF THE INVENTION

1. Field of the Invention

This invention relates to a solid-state image pick-up device which may be employed for a video camera unit or an image scanner for imaging an object using a solid-state image pickup device (CCD image sensor). Note particularly, it relates to a solid-state image pickup device in which the image pickup light radiated on the CCD image sensor is split into an ordinary light and an extraordinary light having its optical axis shifted by a predetermined amount with respect to the optical axis of the ordinary light, and in which imaging may be carried out by shifting the relative position between the CCD image sensor and the image pickup light by electrical means.

2. Description of the Related Art

A solid-state image pickup device, or a CCD image sensor, is extensively used in video cameras or image scanners because of its small size and low power consumption. The CCD image sensor, having a number of pixels on the order of 400,000, is usually mounted on the video camera. However, the CCD image sensor, having the number of the pixels on the order of 400,000, is inferior in resolution to an image tube. Recently, a high resolution television receiver, known as a high-definition (HD) television receiver, has become popular, and a CD image sensor having the number of the pixels increased to 2,000,000 has been developed by reducing the pixel area in order to cope with the HD television receiver. However, if the pixel area is reduced, output image pickup signals of the solid-state image pickup device is lowered in signal level to deteriorate the S/N ratio. In view of the lowering of the S/N ratio, the number of 2,000,00 pixels of the solid-state image pickup device represents a possible upper limit such that it has become difficult to increase the number of pixels to improve the resolution further. On the other hand, since the CCD image sensor having 2,000,000 pixels is insufficient in resolution if it is to be used for inputting a printed text, a demand for a higher resolution has been raised.

For coping with the above problem, a solid-state image pickup device has been developed, in which the relative position between the solid-state image-pickup device (CCD image sensor) and the image pickup light is shifted in an amount equal to one or more integer fractions of the pixel pitch during imaging for increasing resolution by increasing the spatial sampling area without increasing the number of pixels.

With such solid-state image pickup device, the CCD image sensor is mounted on a piezoelectric element and oscillated in one direction from field to field at an amplitude equal to a half pixel pitch for shifting the image pickup light radiated on the CCD image sensor by a pitch equal to a half pixel by way of image shifting for increasing the spatial sampling area for achieving a picture of high resolution without increasing the number of pixels.

There has also been known a solid-state image pickup device in which a thin glass plate is mounted on the front face of the CD image sensor and oscillated at an extreme small angle during imaging. With such solid-state image pickup device, the image pickup light radiated on the CCD image sensor is image-shifted each time the glass plate is oscillated for increasing the spatial sampling area for achieving a picture of high resolution without increasing the number of pixels.

However, with such solid-state image pickup devices, since the image pickup light radiated on the CCD image sensor is image-shifted by mechanical vibrations applied to the CD image sensor itself or to the glass plate mounted ahead of the CCD image sensor, not only the mechanical structure becomes complexicated but also the image shifting is only low in reliability.

For obviating the defect inherent in the solid-state image pickup device effectuating the image shifting by mechanical means, there has also been developed a solid-state image pickup device in which image shifting may be realized by electrical means.

The solid-state image pickup device with electrical image shifting is arranged as shown for example in FIG. 1. When the image pickup is started with the solid-state image pickup device, the image pickup light is converged by a lens 50 so as to be radiated on a birefringence plate 51.

When irradiated with the image pickup light from lens 50, the birefringence plate 51 splits the light into an ordinary light and an extraordinary light having an optical path shifted from the optical path of the ordinary light vertically upwards by a pitch equal to one-half pixel so as to cause these light rays to be radiated on a voltage-control led optical path selecting plate 52.

The voltage-controlled optical path selecting plate 52 is made up e.g. of a liquid crystal plate and a polarization plate. An electrical voltage is applied to the liquid crystal plate at a one-field interval. When the electrical voltage is not applied to the liquid crystal plate, the ordinary light and the extraordinary light, radiated to the liquid crystal plate via the birefringence plate 51, are directly transmitted through the liquid crystal plate and only the ordinary light is transmitted through the polarization plate. When the electrical voltage is applied to the liquid crystal plate, the ordinary light and the extraordinary light, radiated to the liquid crystal plate via the birefringence plate 51, are polarized by 90° when passed through the liquid crystal plate, with the respective optical paths remaining unchanged. Of these light rays, solely the extraordinary light is transmitted through the polarization plate. In this manner, the ordinary light or the extraordinary light is selectively radiated from the voltage-controlled optical path selecting plate 52, at a one-field interval, so as to be radiated on a CCD image sensor 53.

The CCD image sensor 53 receives the ordinary light and extraordinary light to effect photoelectric transfer to generate image-pickup signals which are outputted at an output terminal 54. It is noted that not only the ordinary light but also the extraordinary light having an optical path shifted vertically upwards by a pitch equal to one-half pixel with respect to the optical path of the ordinary light is radiated on the CCD image sensor 53.

This leads to an increased spatial sampling area and to increased resolution.

As compared to a solid-state image pickup device, effectuating the image shifting by mechanical means, the solid-state image pickup device, effectuating the electrical image shifting, is devoid of moving parts of a complicated mechanical system, and hence leads to improved reliability in the image shifting and to a simplified structure of the device in its entirety.

However, with the above-described solid-state image pickup device, the image pickup light is split by the birefringence plate 51 into the ordinary light and the extraordinary light and the electrical voltage applied across the selecting plate 52 is on/off controlled for selecting one of the ordinary light and the extraordinary light from the birefringence plate 51 for radiating the selected light to the CCD image sensor 53. Consequently, the image-pickup light radiated on the CCD image sensor 53 is reduced to substantially one-half the original image pickup light so that only a dark image may be produced.

On the other hand, the recent tendency is towards an increasingly small size of a video camera unit etc. and a demand has been raised for the electrically image-shifting type solid-state image pickup device fabricated in one chip.

OBJECT AND SUMMARY OF THE INVENTION

It is therefore an object of the present invention to provide a solid-state image pickup device which enables light volume loss to be inhibited to assure a lighter image and which may be fabricated in one chip to contribute to reduction in size of the equipment such as a video camera unit.

The present invention provides an image pickup device including first electro-optical effect means selectively operable in a first mode or a second mode, the first electro-optical effect means is designed for splitting an incident image pickup light into an ordinary light ray and an extraordinary light ray having its optical axis shifted vertically with respect to that of the ordinary light ray for the first mode and for transmitting the incident image pickup light as an ordinary light ray for the second mode. The image pickup device also includes light transforming means for transforming the ordinary light ray from the first electro-optical effect means into an extraordinary light ray and for converting said extraordinary light ray from said first electro-optical effect means into an ordinary light ray, and second electro-optical effect means selectively operable in a first mode or a second mode, and designed to transmit said ordinary light ray from the light converting means and to shift the optical axis of the extraordinary light ray vertically with respect to that of the ordinary light ray so that the extraordinary light ray and the ordinary light ray are mixed together for the first mode. The second electro-optical effect means is designed to transmit the extraordinary light ray from the light converting means for the second mode. Finally, the image pickup device includes image sensor means for transforming the ordinary light ray and the extraordinary light ray from the second electro-optical effect means into electrical signals.

With the solid-state image pickup device according to the present invention, the light transforming means is formed by a liquid crystal plate and is provided on the solid-state image sensor along with the first and second electro-optical effect plates to enable the entire device to be formed in one chip.

When the image pickup operation by the solid-state image pickup operation is initiated, an electrical voltage is applied at e.g. every one-half field to the first electro-optical effect plate. When the voltage is turned off, the first electro-optical effect plate directly radiates the image pickup light radiated thereto as an ordinary light without changing its optical path. Conversely, when the voltage is turned on, the first electro-optical plate radiates the image pickup light in the form of an ordinary light and an extraordinary light having its optical axis shifted a predetermined amount with respect to the optical axis of the ordinary light. The ordinary light and the extraordinary light are radiated on the light transforming means.

The second electro-optical effect plate has an electrical voltage applied thereto turned on and off at the same timing as the first electro-optical effect plate, so that, when the voltage is turned off, it directly radiates the extraordinary light radiated thereto via the first electro-optical effect plate and the light transforming means without changing its optical path. When the voltage is turned off, the second electro-optical effect plate shifts the optical path of the extraordinary light radiated thereto via the first electro-optical effect plate and the light transforming means up to the optical path of the ordinary light. The extraordinary light is summed to the ordinary light and the combined light is radiated from the second electro-optical effect plate.

Consequently, if the voltage applied across the first and second electro-optical effect plates is turned off, the image pickup light is not split into the ordinary light and the extraordinary light, so that the image pickup light is radiated on the solid-state image pickup device as the extraordinary light without its optical path being changed. If the voltage applied across the first and second electro-optical effect plates is turned on, the image pickup light is split by the first electro-optical effect plate into the ordinary light and the shifted extraordinary light which is transformed by light transforming means into the ordinary light which is radiated on the second electro-optical effect plate. The ordinary light is transformed by the light transforming means into an extraordinary light which is radiated on the second electro-optical effect plate. When the electrical voltage is applied across the electro-optical effect plates, the extraordinary light has its optical path shifted as described above, and is combined with the ordinary light transformed by the light transforming means into the extraordinary light so as to be radiated on the image pickup device.

The result is image shifting devoid of light volume losses.

Besides, the solid-state image pickup device according to the present invention may be formed in one chip by fabricating the light transforming means by a liquid crystal plate and by mounting the liquid crystal plate on the solid-state image pickup device along with the first and second electro-optical effect plates.

The result is the reduced mounting area for the solid-state image pickup device.

Other objects and advantages of the present invention will become more apparent from the following description of the preferred embodiments and the claims.

DETAILED DESCRIPTION OF THE PREFERRED EMBODIMENTS

Figure 1:
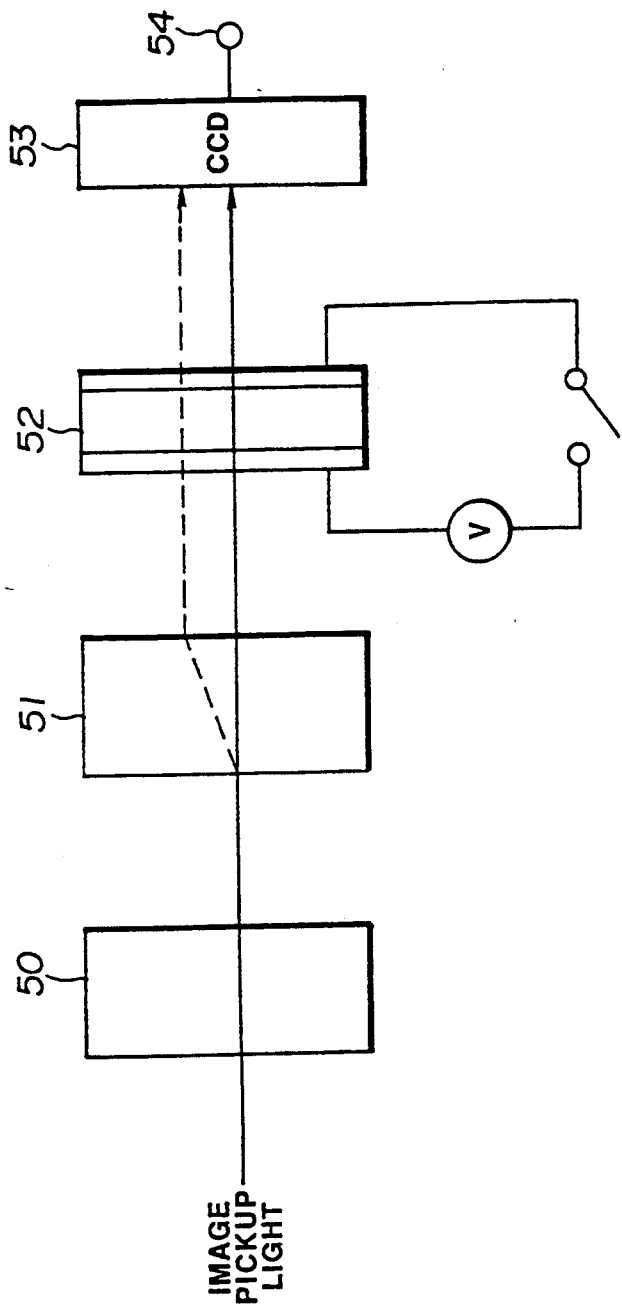
FIG. 1 is a block diagram showing a conventional image pickup device.
Figure 2:
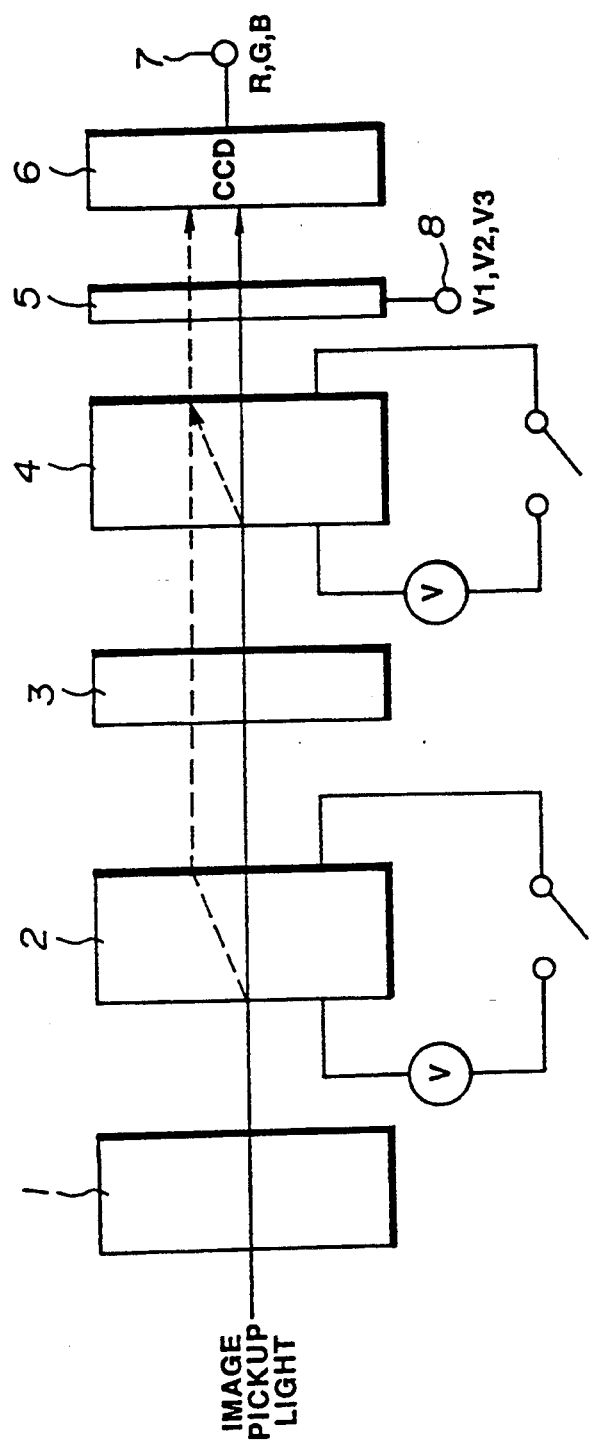
FIG. 2 is a block diagram showing an embodiment of a solid-state image pickup device according to the present invention.
Figure 3:
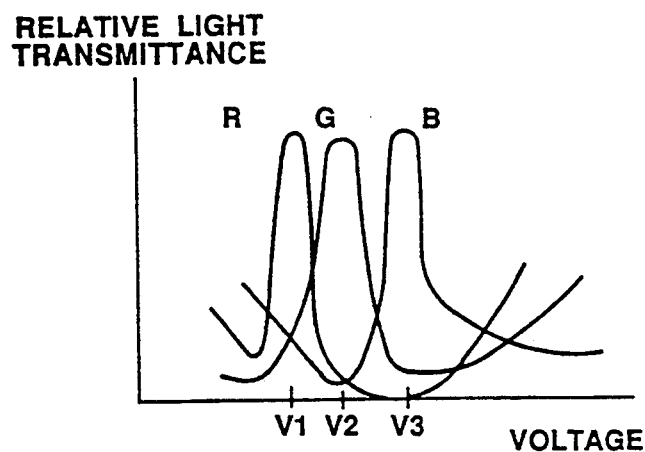
FIG. 3 is a graph showing the relation between the a.c. voltage applied across a color filter provided in the solid-state image pickup device shown in FIG. 2 and light components transmitted through the color filter.

Referring to FIG. 2, the solid-state image pickup device according to the present invention includes a lens 1 for converging the image pickup light incident thereon, and a first birefringence plate 2, as a first electro-optical effect plate. An electrical field, applied across the birefringence plate 2, is turned on and off at a one-field interval, in such a manner that, when the voltage is turned off, the image pickup light radiated via lens 1 is directly radiated as an ordinary light without changing its optical path and, when the voltage is turned on, the image pickup light radiated via lens 1 is radiated as an ordinary light and an extraordinary light having an optical path shifted vertically upwards at a pitch equal to one-half pixel with respect to the optical path of the ordinary light. The image pickup device also includes a half wave plate or $\lambda/2$ plate for transforming the ordinary light radiated thereto when the voltage across the first birefringence plate 2 is turned off into an extraordinary light, and for radiating the resulting extraordinary light, while transforming the ordinary light and the extraordinary light radiated thereto when the voltage across the first birefringence plate 2 is turned on into the extraordinary light and the ordinary light, respectively, and for radiating the resulting extraordinary light and the ordinary light.

The solid-state image pickup device also includes a second birefringence plate 4, as a second electro-optical effect plate. The electrical voltage applied across the birefringence plate 2 is turned on and off at a one-field interval at the same timing as that for the first birefringence plate 2, in such a manner that, when the voltage is turned off, the extraordinary light radiated via the first birefringence plate 2 and the $\lambda/2$ plate 3 is directly transmitted without changing its optical path and, when the voltage is turned on, the optical path of the extraordinary light radiated via the first birefringence plate 2 and the $\lambda/2$ plate 3 is shifted up to the optical path of the ordinary light, with the extraordinary light and the ordinary light being summed and transmitted. The solid-state image pickup device also includes a voltage-dependent transforming type color filter 5 which is driven with three different voltages for red (R), green (G) and blue (B), applied via a voltage terminal 8 as later described, and which is adapted for transforming the ordinary light and the extraordinary light, radiated via the second birefringence plate 4, into R, G or B image-pickup light rays, depending on the applied voltage values. Finally, the image pickup device includes a CCD image sensor 6, as a solid-state image pickup device, for receiving the color image-pickup light rays radiated thereto via color filter 5 to effect photoelectric transfer to generate and output the color image-pickup signals.

The CCD image sensor may be a so-called interlaced scanning type device for reading out electrical charges from odd line pixels and even line pixels for an odd field and an even field, respectively. However, with the present embodiment, the CCD image sensor 6 is of the non-interlaced scanning type, that is, it is designed for reading electrical charges from the pixels of all of the lines of both the odd and even lines.

With the non-interlaced scanning type device, each frame is completed by one field, in distinction from the device in which each frame is completed by an odd field and an even field. That is, there is no difference between the odd and even fields. Conversely, the odd and even fields simply mean two contiguous fields.

Figure 4:
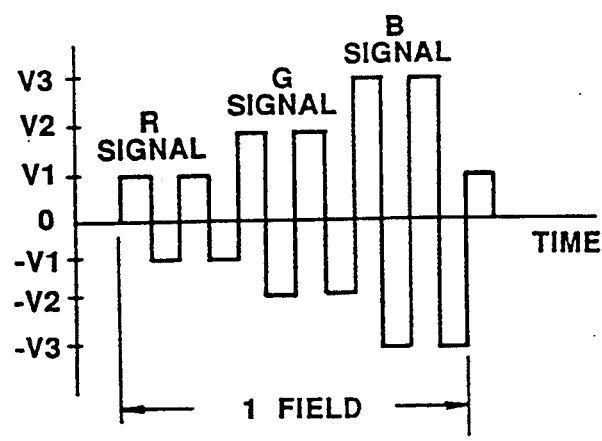
FIG. 4 is a graph for illustrating the a.c. voltage applied across the color filter.

The color filter 5 is constituted by a liquid crystal plate and, if a voltage V1 is applied thereto, it transmits only the image pickup light for red (R) of the radiated image pickup light. On the other hand, if a voltage V2 or V3 is applied thereto, it transmits only the radiated image pickup light for green (G) or the radiated image pick-up light for blue (B). The voltages V1, V2 and V3 are a.c. voltages which are increased sequentially in magnitude in this order, as shown in FIG. 4. These a.c. voltages V1, V2 and V3 are changed over at a one-field interval, with the thus changed over a.c. voltages being applied across the color filter 5. Consequently, the three image-pickup light rays of R, G and B are radiated in this order at the one-field interval from the color filter 5.

The $\lambda/2$ plate 3 may for example be formed by a quartz plate. In the present case, the plate 3 is formed by a twisted nematic phase liquid crystal plate. If the $\lambda/2$ plate 3 is formed by a liquid crystal plate, it may be of an extremely small thickness as compared to the $\lambda/2$ plate 3 formed by the quartz plate. Consequently, the first birefringence plate 2, $\lambda/2$ plate 3, second birefringence plate 4 and the color filter 5 may be bonded to one another and easily affixed to the light receiving surface of the CCD image sensor 6. Thus the solid-state image pickup device of the present invention is formed as a chip including various components excepting the lens 1, that is the first birefringence plate 2, $\lambda/2$ plate 3, second birefringence plate 4, color filter 5 and the CCD image sensor 6.

The operation of the above-described solid-state image pickup device according to the present invention is hereinafter explained.

Referring to FIG. 2, when the image pickup operation of the solid-state image pickup device according to the present invention is initiated, the image pickup light is converged by lens 1 and radiated to the first birefringence plate 2.

Figure 5:
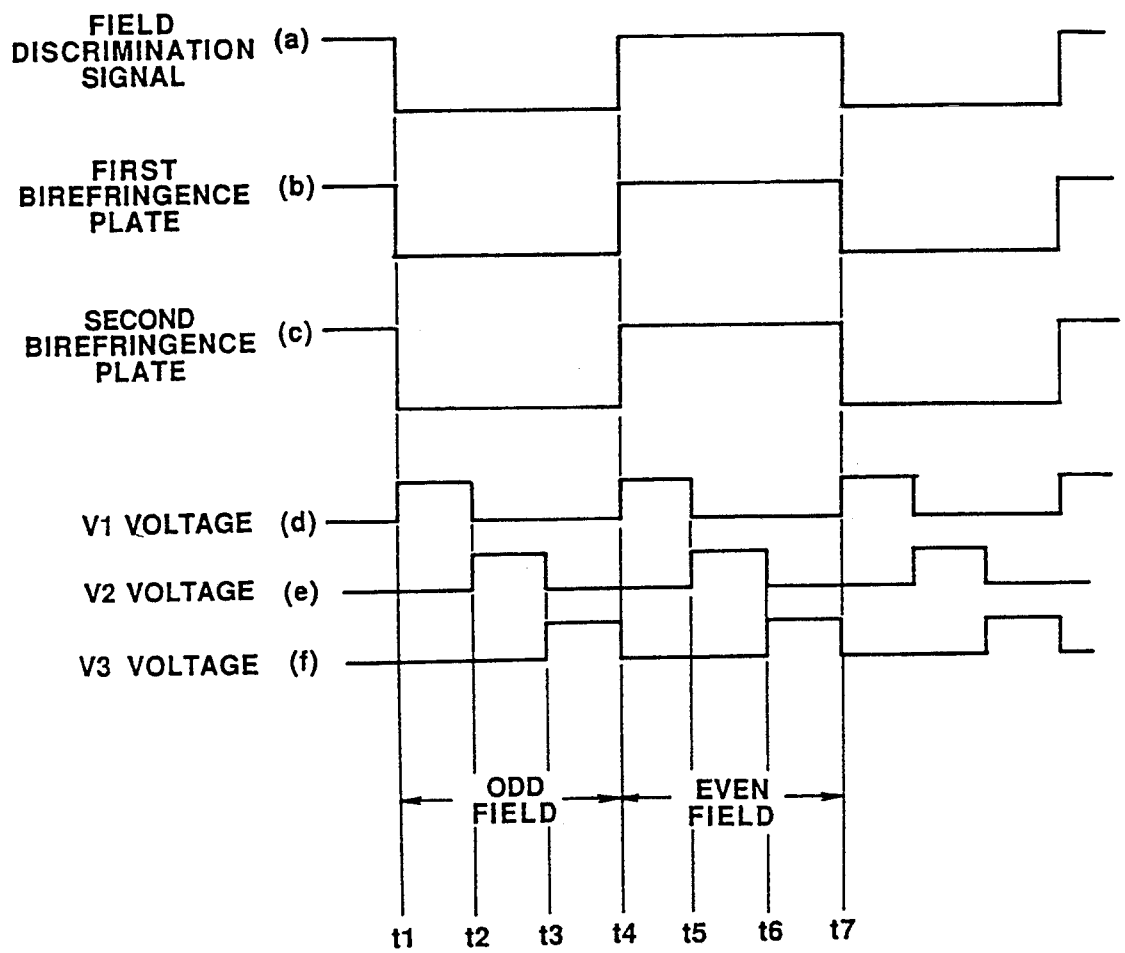
FIG. 5 is a timing chart for illustrating the operation of the solid-state image pickup device shown in FIG. 2.

The voltage applied across the first birefringence plate 2 is turned off and on, as shown at b in FIG. 5, during an odd-field period corresponding to the time period between t1 and t4 and during an even-field period corresponding to the time period between t4 and t7, in timed relation to a field discrimination signal which goes low during the odd field period between time t1 and t4 and which goes high during the even field period between time t4 and t7, as shown at a in FIG. 5.

When the voltage is turned off, the first birefringence plate 2 radiates the image pickup light incident thereon as an ordinary light without changing its optical path. However, when the voltage is turned on, the first birefringence plate splits the image pickup light incident thereon into the above-mentioned ordinary light and an extraordinary light which has its optical path shifted vertically upwards by e.g. a pitch equal to one-half pixel with respect to the optical path of the ordinary light.

Consequently, only the ordinary light is radiated from the first birefringence plate 2 during the odd field period, whereas the ordinary light and the extraordinary light, split from the image pickup light and radiated from the first birefringence plate 2 during the even field period.

Meanwhile, the direction and magnitude of the shift of the optical path of the image pickup light by the first birefringence plate 2 and a second birefringence plate 4 as later explained may be adjusted in dependence upon the shape and/or the properties of the first and second birefringence plates 2, 4 and/or the direction of voltage application.

The ordinary light and the extraordinary light, radiated from the first birefringence plate 2, are subsequently radiated on the λ/2 plate 3.

When irradiated with the ordinary light, the λ/2 place 3 radiates an extraordinary light transformed from the ordinary light with the optical path remaining unchanged. On the other hand, when irradiated with the extraordinary light, the λ/2 plate 3 radiates an ordinary light converted from the extraordinary light with the optical path remaining unchanged.

Thus the λ/2 plate 3 radiates the ordinary light as the extraordinary light during the odd field period. During the even field period, on the other hand, the λ/2 plate 3 radiates the extraordinary light transformed from the ordinary light and the ordinary light transformed from the extraordinary light.

The ordinary light and the extraordinary light, radiated from the λ/2 plate 3, are radiated on the second birefringence plate 4.

An electrical voltage is applied across the second birefringence plate 4 at the same timing as that for the first birefringence plate 2, as shown at c in FIG. 5. That is, the electrical voltage applied across the second birefringence plate 4 is turned off and on during the odd field period corresponding to a time interval between t1 and t4 and during the even field period corresponding to a time interval between t4 and t7, respectively.

If irradiated with the extraordinary light during the voltage turn-off period, the second birefringence plate 4 directly radiates the extraordinary light without changing its optical path. On the other hand, if irradiated with the ordinary light during the voltage turn-on period, the second birefringence plate 4 directly radiates the ordinary light without changing its optical path and, if irradiated with the extraordinary light during the voltage turn-on period, the second birefringence plate 4 shifts the optical path of the extraordinary light vertically upwards by a pitch equal to one-half pixel and radiates the thus shifted extraordinary light.

Consequently, during the odd field period, when the voltage is turned off, the extraordinary light from the λ/2 plate 3 is directly radiated from the second birefringence plate 4, without its optical path being changed. On the other hand, during the even field period, when the voltage is turned on, the extraordinary light incident on the λ/2 plate 3 is directly radiated, without its optical path being changed, while the ordinary light incident on the λ/2 plate 3 has its optical path shifted vertically upwards by a pitch equal to one-half pixel. And the thus shifted ordinary light is radiated. Consequently, when the voltage across the second birefringence plate 4 is turned on, the ordinary light and the extraordinary light are summed together and outputted from the plate 4. The non-shifted image pickup light, as the extraordinary light, which is radiated from the second birefringence plate 4 when the voltage applied thereto is turned off, may be made equal to the shifted image pickup light, which is the light equal to the sum of the extraordinary light and the ordinary light and which is radiated from the second birefringence plate 4 when the voltage supplied thereto is turned on.

Besides, while the image pickup light irradiated via lens 1 is split into the ordinary light and the extraordinary light for optical axis shifting, the ordinary light and the extraordinary light are summed together and radiated, instead of splitting the image pickup light radiated via lens 1 into the ordinary light and the extraordinary light and radiating a selected one of the ordinary light and the extraordinary light, for eliminating the loss in the light volume of the image pickup light before and after shifting.

The ordinary light and the extraordinary light, radiated from the second birefringence plate 4, are radiated to the color filter 5.

An electrical voltage having a voltage value of V1 is applied across the color filter 5 between time t1 and t2 during the odd field period and between time t4 and time t5 during the even field period, as shown at d in FIG. 5. Similarly, an electrical voltage having a voltage value of V2 is applied across the color filter 5 between time t2 and t3 during the odd field period and between time t5 and time t6 during the even field period, as shown at e in FIG. 5, and an electrical voltage having a voltage value of V3 is applied across the color filter 5 between time t3 and t4 during the odd field period and between time t6 and time t7 during the even field period, as shown at f in FIG. 5.

The color filter 5 causes only the radiated image pickup light for red (R), for green (G) or for blue (B) to be transmitted therethrough when the voltage having the values of V1, V2 or V3 is applied thereto, respectively.

Consequently, the image pickup light, which is the extraordinary light, radiated from the color filter 5 during a time interval between time t1 and t2 of the odd field period, is solely the image pickup light for red (R). Similarly, the image pickup light, which is the extraordinary light, radiated from the color filter 5 during a time interval between time t2 and t3 of the odd field period, is solely the image pickup light for green (G), whereas the image pickup light, which is the extraordinary light, radiated from the color filter 5 during a time interval between time t3 and t4 of the odd field period, is solely the image pickup light for blue (B).

On the other hand, the image pickup light, which is the ordinary light and the extraordinary light summed together, radiated during a time interval between time t4 and time t5 of the even field, is solely the image pickup light for red (R). Similarly, the image pickup light, which is the ordinary light and the extraordinary light summed together, radiated during a time interval between time t5 and time t6 of the even field, is solely the image pickup light for green (G), whereas the image pickup light, which is the ordinary light and the extraordinary light summed together, radiated during a time interval between time t6 and time t7 of the even field, is solely the image pickup light for blue (B).

The image pickup light rays for various colors, radiated from the color filter 5, are radiated to the CCD image sensor 6.

The CCD image sensor 6 receives the image pickup lights for various colors radiated thereto to effect photoelelectric transfer to generate corresponding image pickup signals which are outputted. Since the image pickup light radiated on the CCD image sensor 6 is sequentially the image pickup light for red (R), image pickup light for green (G) and the image pickup light for blue (B), for each of the odd and even fields, as described above, the image pickup signals for red (R), for green (G) and for blue (B) are radiated from the CCD image sensor 6 in this order within each field.

The result is that, by using a one-chip CCD image sensor, it becomes possible to output RGB component signals as in the case of a solid-state image pickup device employing separate CCD image sensors for red (R), green (G) and blue (B), that is a so-called three CCD type solid-state image pickup device.

The image pickup signals from the CCD image sensor 6 are supplied via output terminals 7 to an image pickup signal processing circuit, not shown, where they are processed in predetermined manner, and subsequently transmitted to a monitor device etc. for display.

Since the non-shifted image pickup light free of light volume losses and the shifted image pickup light are radiated to the color filter 5, the image pickup light for various colors, radiated on the CCD image sensor 6 via color filter 5, is also devoid of light volume losses.

Consequently, the image pickup signals for various colors having a satisfactory S/N ratio may be generated and outputted by the CD image sensor 6 to enable the dynamic range to be enlarged.

Besides, the image pickup light radiated on the CCD image sensor 6 during the odd field period is the image pickup light, as the extraordinary light, for the various colors at the ordinary radiating positions, whereas the image pickup light radiated on the CCD image sensor 6 during the even field period is the image pickup light, as the ordinary light and the extraordinary light, summed together, for the various prime colors at the radiating positions shifted vertically upwardly from the usual radiating positions by a pitch equal to one-half pixel. In this manner, the number of the horizontal scanning lines may be increased twofold thus improving the vertical resolution.

It is noted that, if the interlaced scanning type CCD image sensor is employed as the solid-state image pickup device, since the charge reading lines are different between the odd and the even fields, the resolution cannot be improved by radiating the image pickup light shifted for every other field vertically upwards at a one-half pixel pitch, unless a one-frame picture is formed by pictures of four or more fields. Besides, if a one-frame picture is formed by four or more fields, the resolution cannot be improved significantly if the picture to be imaged is a moving picture.

However, the image pickup device according to the present invention includes a non-interlaced scanning type solid-state image pickup device, (the above-mentioned CCD image sensor 6) as the solid-state image pickup device. The non-interlaced scanning type CCD image sensor reads out signal charges from the pixels of the totality of the lines both during the scanning of the odd fields and the scanning of the even fields, similarly to the above-mentioned interlaced scanning type CCD image sensor. Consequently, when the above-mentioned image pickup light, which is vertically upwardly shifted at a pitch equal to one-half pixel for every other field, is radiated on the CCD image sensor, the image pickup signals for an odd field and those for an even field are outputted for the first field and for the second field, respectively, so that the image pickup signals similar to those produced by interlaced scanning may be outputted despite the fact that the non-interlaced scanning type CCD image is employed, so that a picture of a high resolution may be produced with two fields.

Besides, since the picture of high resolution may be produced with two fields, the resolution may be improved even although the picture to be imaged is a moving picture.

In addition, with the solid-state image pickup device according to the present invention, the essential components except the lens 1, that is the above-mentioned first birefringence plate 2, λ/2 plate 3, which is a twisted nematic phase liquid crystal plate, second birefringence plate 4, color filter 5 and the CCD filter 6, are formed in one chip.

The result is reduction in a mounting floor space for the solid-state image pickup device, contributing to reduction in size of the equipment such as the video camera unit in which the solid-state image pickup device is to be mounted.

On the other hand, the λ/2 plate 3 is fabricated from an inexpensive liquid crystal plate. Consequently, the solid-state image pickup device may be fabricated at low costs to contribute to cost reduction of the equipment, such as the video camera unit.

Finally, the basic concept of the present invention resides in that there are provided, at a pre-stage of the CCD image sensor, a first birefringence plate directly radiating the image pickup light as the ordinary light, when the voltage is turned off, with the optical path of the image pickup light remaining unchanged, and radiating the ordinary light and an extraordinary light having its optical path shifted by a predetermined amount with respect to the optical path of the ordinary light, when the voltage is turned off, a λ/2 plate for transforming the ordinary light radiated thereto into an extraordinary light and radiating the resulting extraordinary light and for radiating the extraordinary light radiated thereto as the ordinary light, and a second birefringence plate for directly radiating the extraordinary light radiated thereto when the voltage is turned off and for directly radiating the extraordinary light when the voltage is turned on, with the optical path remaining unchanged and radiating the ordinary light with a optical path shift of a predetermined amount in this sequence, and in that the voltage supplied across the first and second birefringence plates are turned on and off simultaneously to prevent light volume losses of the non-shifted image pickup light and the shifted image pickup light which are to be radiated on the CCD image sensor. Consequently, the present invention is not limited to the above-described particular constitution. For example, color filters for R, G and B colors may be provided on the pixels of the CCD image sensor, instead of providing the color filter 5. The CCD image sensor may be of the monochromatic type. Besides, the λ/2 plate 3 may be formed of a quartz plate, while the CCD image sensor of the interlaced scanning type may also be employed.

The basic concept of the present invention also consists in fabricating the λ/2 plate 3 from a liquid crystal plate and mounting it on the CCD image sensor along with the second birefringence plate for providing the solid-state image pickup device by one chip. In such case, It is difficult to fabricate the λ/2 plate 3 from a quartz plate to provide the one-chip device. However, the color filters for R, G and B colors may be provided on the pixels of the CCD image sensor, instead of providing the color filter 5, as mentioned above. Alternatively, the CCD image sensor may be of the monochromatic type. Besides, the CCD image sensor for interlaced scanning may also be used as the CCD image sensor.

What is claimed is:

1. A high definition image pickup device comprising, first electro-optical effect means selectively operable in a first mode or a second mode, said first electro-optical effect means being designed for splitting an incident image pickup light into an ordinary light ray and an extraordinary light ray having its optical axis shifted vertically with respect to that of said ordinary light ray for said first mode and for transmitting said incident image pickup light as an ordinary light ray for said second mode, light transforming means for transforming said ordinary light ray from said first electro-optical effect means into an extraordinary light ray and for transforming said extraordinary light ray from said first electro-optical effect means into an ordinary light ray, second electro-optical effect means selectively operable in a first mode or a second mode, said second electro-optical effect means being designed to transmit said ordinary light ray from said light transforming means and to shift the optical axis of said extraordinary light ray vertically with respect to that of said ordinary light ray so that said extraordinary light ray and said ordinary light ray are mixed together for said first mode, said second electro-optical effect means being designed to transmit said extraordinary light ray from said light transforming means for said second mode, and image sensor means for transforming said ordinary light ray and said extraordinary light ray from said second electro-optical effect means into electrical signals, wherein said image sensor means is operated by non-interlaced scanning, wherein said first and second electro-optical effect means are controlled by an electric signal for alternatingly selecting one or the other of the first and second modes, wherein said first mode or said second mode is selected at a one-field interval, wherein said extraordinary light ray is shifted vertically by a pitch equal to one-half pixel by said first and second electro-optical means in said first mode and said first and second electro-optical means shift said extraordinary light ray in the opposite directions, and wherein said image sensor means is a charge-coupled device.

2. The image pickup device as claimed in claim 1 wherein said first electro-optical effect means is a low-pass filter.

3. The image pickup device as claimed in claim 1 wherein said light transforming means is a half wave plate.

4. The image pickup device as claimed in claim 1 wherein said first electro-optical means, light converting means and the second electro-optical means are formed on said image sensor means.

* * * * *